US012038289B2

(12) United States Patent
Vogt

(10) Patent No.: US 12,038,289 B2
(45) Date of Patent: Jul. 16, 2024

(54) AUTONOMOUS VEHICLE IDENTIFICATION

(71) Applicant: GM Cruise Holdings LLC, San Francisco, CA (US)

(72) Inventor: Kyle Vogt, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 218 days.

(21) Appl. No.: 17/357,256

(22) Filed: Jun. 24, 2021

(65) Prior Publication Data

US 2022/0412752 A1 Dec. 29, 2022

(51) Int. Cl.
*G01C 21/34* (2006.01)
*B60W 60/00* (2020.01)
*G06V 40/16* (2022.01)
*H04B 17/318* (2015.01)
*H04W 4/40* (2018.01)

(52) U.S. Cl.
CPC ....... *G01C 21/3438* (2013.01); *B60W 60/001* (2020.02); *G06V 40/161* (2022.01); *H04B 17/318* (2015.01); *H04W 4/40* (2018.02)

(58) Field of Classification Search
CPC ............ G01C 21/3438; B60W 60/001; G06V 40/161; H04B 17/318; H04B 17/27; H04W 4/40
See application file for complete search history.

(56) References Cited

U.S. PATENT DOCUMENTS

| | | |
|---|---|---|
| 10,310,505 B1 | 6/2019 | Hanson et al. |
| 10,580,291 B1 * | 3/2020 | Rothenberg ........ G01C 21/3438 |
| 10,607,491 B2 | 3/2020 | Matthiesen et al. |
| 10,809,081 B1 | 10/2020 | Kentley-Klay et al. |
| 10,857,938 B2 | 12/2020 | Lujan et al. |
| 2018/0075754 A1 * | 3/2018 | Salter ..................... H04W 4/023 |
| 2018/0129981 A1 * | 5/2018 | Fujimoto ............. G08G 1/0962 |
| 2021/0019854 A1 * | 1/2021 | Iagnemma ............. G06Q 50/30 |
| 2021/0078490 A1 | 3/2021 | Lujan et al. |
| 2021/0345064 A1 * | 11/2021 | Choi ...................... H04W 4/027 |
| 2022/0080879 A1 * | 3/2022 | Moon .................... B60Q 1/543 |

* cited by examiner

*Primary Examiner* — Isaac G Smith
*Assistant Examiner* — Nikki Marie M Molina

(57) ABSTRACT

Systems and methods for providing indications to identify a selected autonomous vehicle, thereby distinguishing the selected autonomous vehicle from other autonomous vehicles in a fleet. In particular, autonomous vehicles that are not paired with a specific nearby user may employ various exterior indicators to dissuade the user from entering. Additionally, autonomous vehicles that are not paired with the specific nearby user may provide guidance toward the user's autonomous vehicle.

20 Claims, 8 Drawing Sheets

AUTONOMOUS VEHICLE IDENTIFICATION

CROSS REFERENCE TO RELATED APPLICATIONS

This Application is related to previously filed U.S. patent application Ser. No. 17/106,119 filed on Nov. 29, 2020, titled "Autonomous Vehicle Identification", which is a continuation of U.S. patent application Ser. No. 16/112,871 filed on Aug. 27, 2018, titled "Autonomous Vehicle Identification", which Applications are incorporated herein by reference in their entirety into the disclosure of this application.

FIELD OF THE DISCLOSURE

The present disclosure relates generally to autonomous vehicles (AVs) and to systems and methods for identifying an autonomous vehicle.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations.

According to an exemplary interaction scenario, a passenger who desires to be picked up for a ride may hail an autonomous vehicle by sending a request utilizing a computing device (e.g., a mobile computing device). Responsive to the request, a particular autonomous vehicle from a fleet of autonomous vehicles can be assigned to provide a ride for the passenger to be picked up. The autonomous vehicle, for instance, may need to travel to a pickup location to meet the passenger to be picked up.

However, conventional autonomous vehicles may be difficult to distinguish, especially when many of the autonomous vehicles in the fleet are relatively homogenous and have similar appearances. Thus, identification of the autonomous vehicle assigned to provide the ride for the passenger may be challenging and time consuming. Identification of the autonomous vehicle may be particularly difficult in a high traffic area where a number of autonomous vehicles from the fleet are being concurrently hailed by different passengers. Moreover, such distinguishing of a vehicle from a fleet is particularly problematic for autonomous vehicles as compared to conventional human driven vehicles, since there is no driver to communicate that the autonomous vehicle has been assigned to provide the ride to the particular passenger. Thus, for instance, a passenger to be picked up may not know which autonomous vehicle to attempt to enter when more than one autonomous vehicle is within proximity of the passenger. Further, a passenger may attempt to enter into an incorrect autonomous vehicle; if a passenger were to enter into an incorrect autonomous vehicle, overall fleet planning can be detrimentally impacted. Additionally, accidentally entering the incorrect vehicle or not being able to find the correct vehicle creates delays both for that passenger and also potentially for expecting passengers of the incorrect vehicle.

SUMMARY

Systems and methods are provided for providing indications to identify a selected autonomous vehicle, thereby distinguishing the selected autonomous vehicle from other autonomous vehicles in a fleet. In particular, autonomous vehicles that are not paired with a specific nearby user may employ various exterior indicators to dissuade the user from entering. Additionally, autonomous vehicles that are not paired with the specific nearby user may provide guidance toward the user's autonomous vehicle.

According to one aspect, a method for autonomous vehicle identification comprises assigning a first autonomous vehicle to a user; determining a pick-up location; detecting a decrease in a first distance between the user and a second autonomous vehicle at the pick-up location; and performing, by the second autonomous vehicle, a notification operation, wherein the notification operation is configured to indicate that the second autonomous vehicle is not assigned to the user.

In some implementations, detecting the decrease in the first distance includes: receiving, at the second autonomous vehicle, a signal from a mobile device of the user, and determining, based on the received signal, a second distance between the mobile device and the second autonomous vehicle. In some implementations, detecting the decrease in the first distance includes detecting an increase in a strength of the received signal. In some implementations, detecting the decrease in the first distance includes identifying the user via facial recognition.

In some implementations, the method further comprises determining a change in a second distance between the user and the first autonomous vehicle. In some implementations, the method further comprises determining the user is approaching the second autonomous vehicle.

In some implementations, performing the notification operation includes activating at least one of a visual notification, an audible notification, and a motion notification on the second autonomous vehicle. In some implementations, performing the notification operation includes activating a notification indicator perceivable from a position external to the second autonomous vehicle.

According to another aspect, a system for autonomous vehicle identification in an autonomous vehicle fleet, comprises a first autonomous vehicle; a central computing system configured to assign the first autonomous vehicle to a user for a user ride including a pick-up location; and a second autonomous vehicle including: a sensor system configured to detect the user at the pick-up location, and further configured to detect a decrease in a first distance between the user and the second autonomous vehicle; and a notification system configured to perform a notification operation to indicate that the second autonomous vehicle is not assigned to the user.

In some implementations, the notification system includes at least one of a sound system, a lighting system, and a motion system. In some implementations, the notification system includes a notification indicator perceivable from a position external to the second autonomous vehicle. In some implementations, the notification indicator directs the user to the first autonomous vehicle. In some implementations, the central computing system is configured to communicate with a user device via a rideshare application, and the rideshare application includes an option for activating the notification system. In some implementations, the first autonomous vehicle includes a first notification system configured to perform a first notification operation to indicate that the first autonomous vehicle is assigned to the user. In some implementations, the first autonomous vehicle includes a sensor system configured to detect the user at the pick-up location, and further configured to determine a second distance between the user and the first autonomous vehicle. In some implementations, the sensor system is configured to receive a signal from a mobile device of the user and wherein the sensor system is further configured to determine the first distance based on the signal.

According to another aspect, an autonomous vehicle having an autonomous vehicle identification system, comprises a computing system configured to receive a first identity of an assigned passenger and a second identity of an unassigned passenger; a sensor system configured to detect the assigned passenger and the unassigned passenger at a pick-up location, and further configured to detect a decrease in a distance between the unassigned passenger and the autonomous vehicle; and a notification system configured to perform a notification operation to indicate that the autonomous vehicle is not assigned to the unassigned passenger.

In some implementations, the notification system includes at least one of a sound system, a lighting system, and a motion system. In some implementations, the notification system includes a notification indicator perceivable from a position external to the autonomous vehicle. In some implementations, the notification indicator directs the unassigned passenger towards a second autonomous vehicle, wherein the second autonomous vehicle is assigned to the unassigned passenger.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
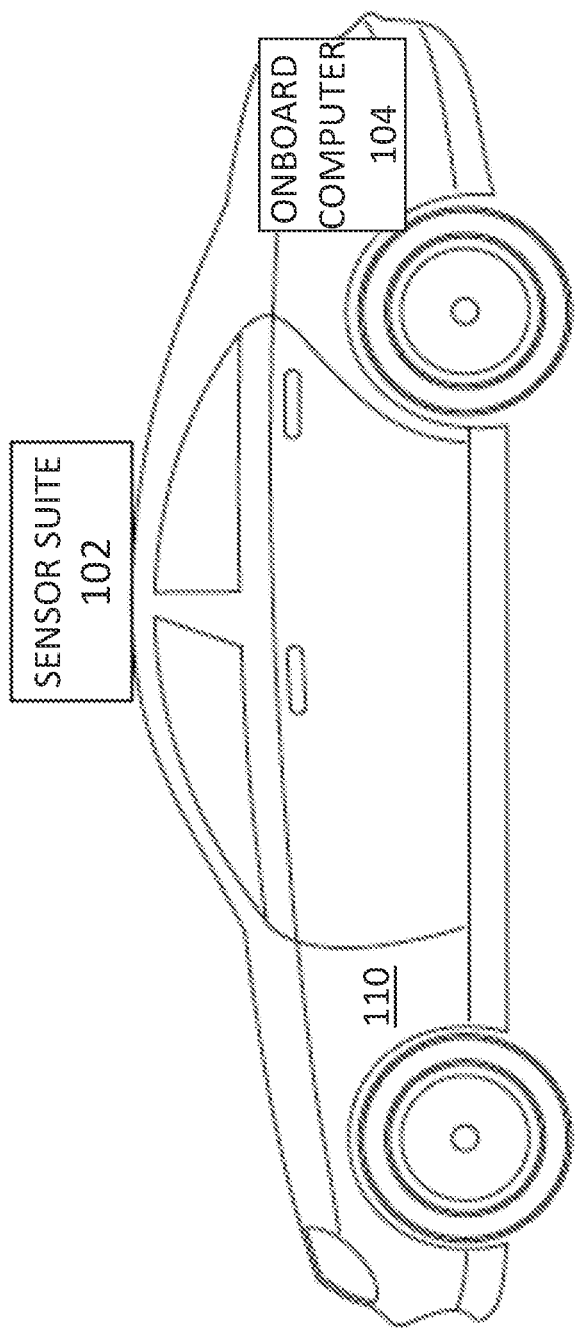
FIG. 1 is a diagram illustrating an autonomous vehicle, according to some embodiments of the disclosure.

Systems and methods are provided for providing indications to identify a selected autonomous vehicle, thereby distinguishing the selected autonomous vehicle from other autonomous vehicles in a fleet. In particular, autonomous vehicles that are not paired with a specific nearby user may employ various exterior indicators to dissuade the user from entering. Additionally, autonomous vehicles that are not paired with the specific nearby user may provide guidance toward the user's autonomous vehicle.

When a passenger orders an autonomous vehicle ride from a rideshare application, an autonomous vehicle is routed to the passenger pick-up location. However, in some instances, the passenger pick-up location is the same as and/or similar to the pick-up location for other passengers using the same rideshare service. Conventional autonomous vehicles can be difficult to distinguish from one another, especially autonomous vehicles in the same fleet, which are relatively homogenous and have similar appearances by design. Identification of the autonomous vehicle may be particularly difficult in a high traffic area where a number of autonomous vehicles from the fleet are being concurrently hailed by different passengers. Thus, when multiple autonomous vehicles from the same autonomous vehicle fleet are present in one general pick-up area, it can be difficult for a passenger to determine which autonomous vehicle is assigned to provide the passenger's ride. Thus, in various instances, a passenger waiting at a pick-up location may not know which autonomous vehicle to attempt to enter when more than one autonomous vehicle is within proximity of the passenger.

In various implementations, a fleet-level approach is provided for helping a passenger identify the correct autonomous vehicle. While a passenger's assigned autonomous vehicle can provide indications to help the passenger identify the autonomous vehicle, other autonomous vehicles in the fleet (not assigned to the passenger) can also provide indications to the passenger to help the passenger identify the correct vehicle. For example, the correct autonomous vehicle can flash its headlights, honk its horn, or display a green checkmark or message on a display screen. Similarly, other nearby autonomous vehicles in the autonomous vehicle fleet can provide indications to the passenger that the other vehicles are incorrect vehicles. For example, the other vehicles can display a red "X", light up the interior cabin red, play a message, or otherwise indicate to the passenger that the other vehicles are not assigned to the passenger. In some examples, when a passenger approaches an incorrect vehicle, a notification of incorrect vehicle is displayed/played to the passenger.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Example Autonomous Vehicle Configured for AV Identification

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 is configured for alerting approaching passengers if the autonomous vehicle 110 is assigned to the passenger or not.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events. In particular, data from the sensor suite 102 can be used to update a map with information used to develop layers with waypoints identifying selected events, the locations of the encountered events, and the frequency with which the events are encountered at the identified location. In some examples, data from the sensor suite 102 can include information regarding crowds and/or lines outside and/or around selected venues. Additionally, sensor suite 102 data can provide localized traffic information. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

In some implementations, the sensor suite 102 can be used to detect nearby passengers, for example via a rideshare application on passenger mobile devices. The sensor suite 102 can track movement of nearby passengers. In some implementations, the sensor suite 102 can be used to detect nearby autonomous vehicles in the same fleet as the autonomous vehicle 110, and track movement of nearby the autonomous vehicles.

In some implementations, data from the sensor suite 102 can be used to detect a passenger exiting a vehicle and/or to determine that a passenger has exited a vehicle. In some examples, a passenger drop-off determination is satisfied by detecting that a passenger has exited the vehicle. For instance, interior and/or exterior cameras can be used to detect that a passenger has exited the vehicle. In some examples, other interior and/or exterior sensors can be used to detect that a passenger has exited the vehicle.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. Additionally, the cameras can be used to automatically and/or manually capture images of passengers inside the vehicle. In some examples, the autonomous vehicle 110 includes one or more weight sensors inside the vehicle, which can be used to detect items or people inside the vehicle. In some examples, the interior sensors can be used to detect passengers inside the vehicle. In some examples, the autonomous vehicle 110 includes one or more lights inside the vehicle, and selected lights can be illuminated as an indication to an approaching passenger of whether the autonomous vehicle is assigned to the approaching passenger. In one example, if the autonomous vehicle is assigned to the approaching passenger, green lights are illuminated. In contrast, in another example, if the autonomous vehicle is not assigned to the approaching passenger, red lights are illuminated. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Method for Autonomous Vehicle Identification

Figure 2:
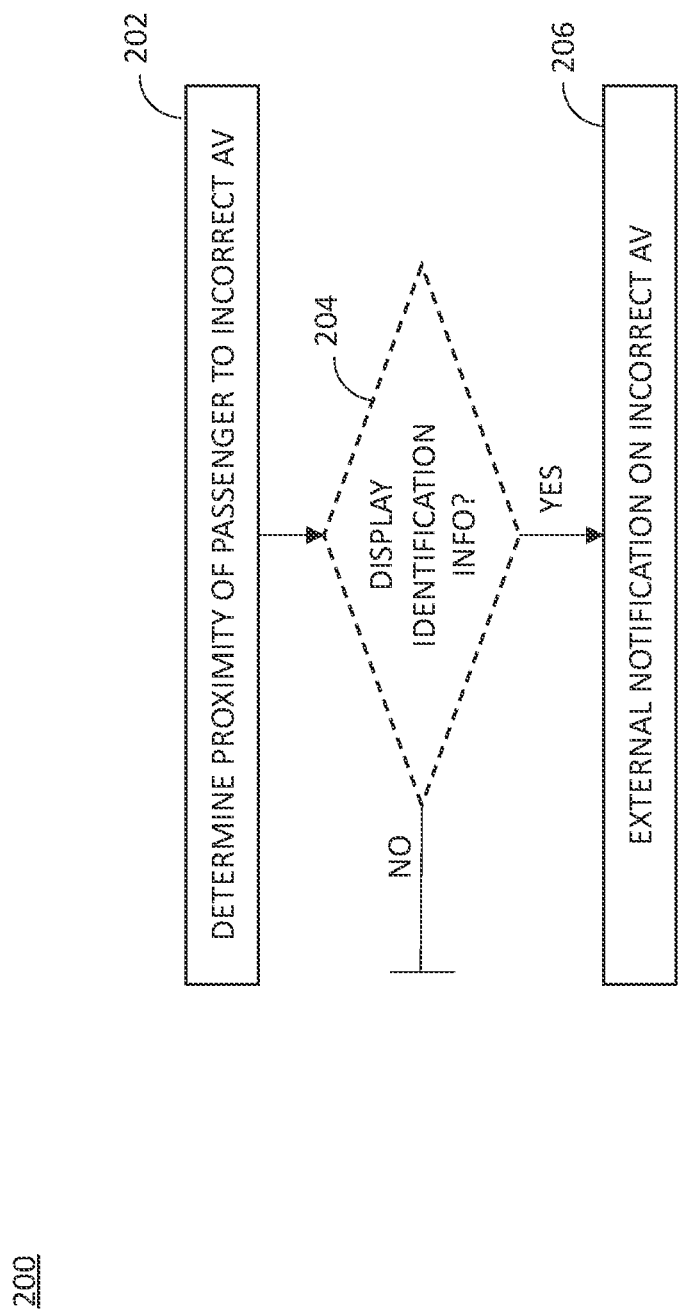
FIG. 2 is a diagram illustrating a method for autonomous vehicle identification, according to various embodiments of the disclosure.

FIG. 2 is a diagram illustrating a method 200 for autonomous vehicle identification, according to various embodiments of the disclosure. In particular, the method 200 is a method for an incorrect autonomous vehicle (an autonomous vehicle not assigned to the passenger) to notify the passenger that the autonomous vehicle is not the correct autonomous vehicle (it is not the autonomous vehicle the passenger hailed).

At step 202, the proximity of a passenger to the incorrect autonomous vehicle is determined. In some implementations, the distance between the passenger and the incorrect autonomous vehicle is determined based on the distance between the autonomous vehicle and the passenger's mobile device. In various examples, direct signal communication can be used to determine the distance between the autonomous vehicle and the passenger's mobile device. In some examples, ultrawide band signals can be used to determine the distance between the autonomous vehicle and the passenger's mobile device. In some examples, GPS information is used to determine the distance between the autonomous vehicle and the passenger's mobile device. In particular, GPS information from the passenger's mobile device can be used to determine the location of the passenger, and autonomous vehicle GPS information and/or geographical information can be used to determine the location of the autonomous vehicle. Using the location information, the distance between the passenger and the autonomous vehicle is determined. In some examples, facial recognition is used to identify the passenger, and various autonomous vehicle sensors are used to determine the distance of the passenger from the autonomous vehicle.

At step 204, optionally, the passenger activates vehicle identification via a mobile device. In some examples, the passenger pushed a button on rideshare application interface on the passenger's phone to activate vehicle identification. In some examples, the passenger's mobile device rideshare application prompts the passenger regarding whether the passenger would like nearby autonomous vehicles to display identification information. In some examples, an autonomous vehicle detects the passenger approaching the vehicle, triggering the mobile device prompt. If the passenger opts not have autonomous vehicles display identification information, the method 200 ends at step 204. If the passenger allows autonomous vehicles to display identification information, the method 200 proceeds to step 206.

At step 206, the incorrect autonomous vehicle presents an external notification. The external notification is designed to alert the passenger that the incorrect autonomous vehicle is not the autonomous vehicle assigned to the passenger for the passenger's ride. In some examples, the incorrect autonomous vehicle displays a red light (on the exterior of the vehicle and/or in the interior vehicle cabin), an arrow pointing towards the correct autonomous vehicle, and/or a map of the area showing a path to the correct autonomous vehicle. In some examples, the incorrect autonomous vehicle emits an audio signal indicating that the vehicle is the incorrect autonomous vehicle, and/or an audio signal including directions to the correct autonomous vehicle.

In some examples, both a correct passenger and an incorrect passenger both approach an autonomous vehicle, and the autonomous vehicle displays signals for both passengers. In one example, the correct passenger approaches the vehicle from the front side, and the front half of the vehicle performs identification information indicating it is the correct vehicle. In this example, the incorrect passenger approaches the vehicle from the rear side, and the rear half of the vehicle performs identification information indicating it is the incorrect vehicle. In some examples, an alert on the passengers' mobile devices indicates whether each passenger is approaching is the correct or incorrect vehicle. In some examples, each passenger has a customized identification notification profile (discussed in greater detail below with respect to FIG. 3), including customized indications for incorrect vehicles, and each passenger's identification indicators are performed by the autonomous vehicle. The multiple passenger's identification indicators can be performed simultaneously or interspersed. In some examples, the autonomous vehicle uses directional identification notifications (such as directional displays and directional audio), and the autonomous vehicle directs different identification notifications to each approaching passenger. In some examples, the autonomous vehicle displays the external notification for the passenger who is closer to the vehicle.

Example Autonomous Vehicle Notification System

Figure 3:
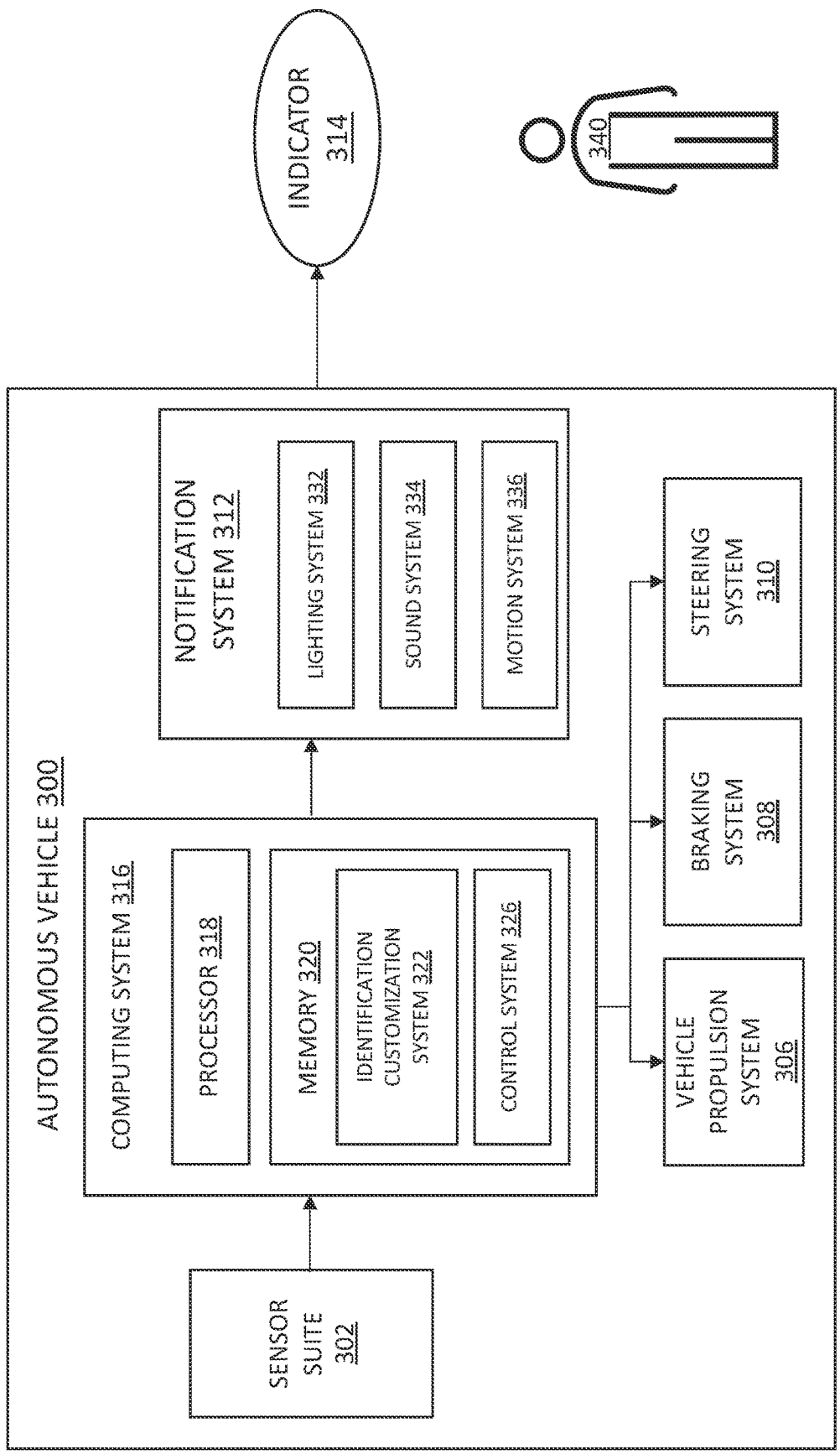
FIG. 3 is a diagram illustrating an autonomous vehicle including various components in a vehicle identification system, according to some embodiments of the disclosure.

FIG. 3 is a diagram 300 illustrating an autonomous vehicle 300 including various components in a vehicle identification system, according to some embodiments of the disclosure. The autonomous vehicle 300 includes a sensor suite 302, similar to the sensor suite 102 described above with respect to FIG. 1. The diagram of the autonomous vehicle 300 components also shows several mechanical systems that are used to effectuate appropriate motion of the autonomous vehicle 300. For instance, the mechanical systems can include, but are not limited to, a vehicle propulsion system 306, a braking system 308, and a steering system 310. The vehicle propulsion system 306 may be an electric motor, an internal combustion engine, or a combination thereof. The braking system 308 can include an engine brake, brake pads, actuators, and/or any other suitable componentry that is configured to assist in decelerating the autonomous vehicle 300. The steering system 310 includes suitable componentry that is configured to control the direction of movement of the autonomous vehicle 300.

The diagram of the autonomous vehicle 300 components also illustrates a notification system 312. The notification system 312 is configured to output an indicator 314. The indicator 314 outputted by the notification system 312 is perceivable external to the autonomous vehicle 300. According to one example, the notification system 312 includes a lighting system 332 that emits a visual indicator viewable external to the autonomous vehicle 300. According to another example, the notification system 312 includes a sound system 334 that emits an audible indicator perceivable external to the autonomous vehicle 300. According to some examples, the notification system 312 includes a motion system 336 that causes physical movement of the autonomous vehicle 300 and/or movement of a component of the autonomous vehicle 300.

In some examples, the notification system 312 includes a lighting system 332, a sound system 334, and a movement system 336. Thus, the indicator 314 outputted by the notification system 312 can be a visual indicator, an audible indicator, a motion indicator, or a combination thereof. Pursuant to an implementation in which the notification system 312 includes a lighting system 332, a sound system 334, and a motion system, 336, it is to be appreciated that the notification system 312 can concurrently emit a visual indicator and/or an audible indicator and/or a motion indicator during a common time period (e.g., the indicator 314 can include the visual indicator and the audible indicator and the motion indicator), or the notification system 312 can emit a visual indicator and an audible indicator and a motion indicator during different time periods (e.g., the indicator 314 outputted during a particular time period can be one of the visual indicator or the audible indicator or the motion indicator). For instance, the identification customization system 322 can cause the notification system 312 to emit either a visual indicator or an audible indicator or a motion indicator based on factors such as time of day, location of the autonomous vehicle, preference of the passenger 324, a combination thereof, or the like.

The autonomous vehicle 300 includes a computing system 316 having a processor 318 and a memory 320. The memory includes an identification customization system 322 that is configured to control the notification system 312 of the autonomous vehicle 300 to output the indicator 314. The identification customization system 322 can control the indicator 314 outputted by the notification system 312 such that a characteristic of the indicator 314 is controlled based on an identity of a passenger 340 to be picked up and whether the autonomous vehicle 300 is stopped for passenger pickup. Thus, a characteristic of an indicator 314 outputted by the notification system 312 can differ for the passenger 340 as compared to a different passenger. According to one example, a pink light can be emitted for the passenger 324 while a purple light can be emitted for a different passenger. Additionally, a characteristic of an indicator 314 outputted by the notification system 312 can differ for the correct passenger 340 versus for an incorrect passenger, such that the notification system 312 can be used to notify an incorrect passenger that the autonomous vehicle 300 is not the autonomous vehicle the incorrect passenger hailed. Moreover, the identification customization system 322 can modify the characteristic of the indicator 314 over time based on a state of the autonomous vehicle 300. For instance, a pink light emitted for the passenger 340 can be flashing while the autonomous vehicle 300 is moving (prior to passenger pickup) and the pink light emitted for the passenger 340 can be solid while the autonomous vehicle 300 is stopped for passenger pickup.

The memory 320 additionally includes a control system 326. The control system 326 is configured to control at least one of the mechanical systems of the autonomous vehicle 300 (e.g., at least one of the vehicle propulsion system 306, the braking system 308, and/or the steering system 310). Moreover, the control system 326 can be configured to provide data corresponding to the control of the mechanical system(s) to the identification customization system 322. For instance, the control system 326 can provide data to the identification customization system 322 specifying the state of the autonomous vehicle 100 (e.g., whether or not the control system 326 has caused the mechanical system(s) to stop the autonomous vehicle 300 for passenger pickup). Thus, the identification customization system 322 can control the notification system 312 to output the indicator 314 based on the data corresponding to the control of the mechanical system(s) received from the control system 326.

As depicted in FIG. 3, the notification system 312 can include a lighting system 332, a sound system 334, and a motion system 336. Thus, the identification customization system 322 can control the lighting system 332 and/or the sound system 334 and/or the motion system 336 to output the indicator 314.

According to some examples, the identification customization system 322 can cause the lighting system 332 to emit a visual indicator viewable external to the autonomous vehicle 300. A characteristic of the visual indicator to be output by the lighting system 332 can be based on the identity of the passenger 340 to be picked up and whether the autonomous vehicle 300 is stopped for passenger pickup (e.g., as controlled by the control system 326). In some examples, a characteristic of the visual indicator to be output by the lighting system 332 can be based on the identity of a nearby incorrect passenger. In some examples, the visual indicator is displayed on the autonomous vehicle 300 (or a portion thereof) and/or nearby the autonomous vehicle 300 (e.g., the visual indicator can be projected by the lighting system 332 onto the ground nearby the autonomous vehicle 300).

The lighting system 332 can include substantially any number of lights that can be incorporated into or mounted upon the autonomous vehicle 300. The lights of the lighting system 332 can include substantially any type of lights (e.g., the lighting system 332 can include various light emitting diodes (LEDs)). It is contemplated that a subset of the lights of the lighting system 332 can emit the visual indicator at a given time, while a remainder of the lights of the lighting system 332 need not be illuminated (e.g., a light bar on one door of the autonomous vehicle 300 can be illuminated while a light bar on a differing door is not illuminated). The lights of the lighting system 332 can be color addressable. Moreover, according to an example, the lights of the lighting system 332 can emit light in a controllable direction from the autonomous vehicle 300. Further, is to be appreciated that the lights of the lighting system 332 can be located at substantially any location on the autonomous vehicle 300 (e.g., on a top of the autonomous vehicle 300 around a LIDAR sensor system, underneath the autonomous vehicle 300, on doors of the autonomous vehicle 300, on windows of the autonomous vehicle 300, on trim surrounding doors and/or windows of the autonomous vehicle 300).

According to some examples, a characteristic of a visual indicator 314 can be a color of the visual indicator. The identification customization system 322 can cause the lighting system 332 to emit a pink light based on the identity of the passenger 340 to be picked up, whereas the identification customization 322 can cause a differing color light to be emitted by the lighting system 332 when the autonomous vehicle 300 is to be picking up a different passenger other than the passenger 340. For instance, the passenger 340 may specify that a pink light be used. Alternatively, the identification customization system 322 can select that a pink light be used for the passenger 340, which may be communicated to a computing device of the passenger 340. In some examples, the identification customization 322 can cause a first color light to be emitted for a correct passenger 340 and a different color light to be emitted for an incorrect passenger. In some examples, passengers can customize correct vs. incorrect vehicle light emission options in a rideshare application.

In some implementations, the passenger 340 can specify a color for a visual indicator under the autonomous vehicle 300. In particular, the passenger 340 can specify a color for a visual indicator under the correct autonomous vehicle 300. Additionally, the passenger 340 can specify a color for a visual indicator under incorrect autonomous vehicles, such that when the passenger 340 approaches an incorrect autonomous vehicle, a different color light is emitted. The identification customization system 322 can cause the lighting system 332 to emit the visual indicator under the autonomous vehicle 300 having such color when the autonomous vehicle 300 has pulled over and stopped for passenger pickup. The visual indicator can serve dual-purposes, namely, to identify to the passenger 340 that the autonomous vehicle 300 has pulled over, completely stopped, and will not move again until the passenger 340 enters into the autonomous vehicle 300 as well as to identify that the autonomous vehicle 300 is assigned to pick up the passenger 340 for a ride. The foregoing can help, particularly in high traffic areas, at night, and/or in a location at which a significant number of autonomous vehicles are within geographic proximity.

According to another example, the characteristic of the visual indicator can include a location of the visual indicator relative to the autonomous vehicle 300. For instance, the location can be on or near a particular door of the autonomous vehicle 300, on or near by a particular window of the autonomous vehicle 300, or the like. The location of the visual indicator can further be controlled by the identification customization system 322 based on a seat in the autonomous vehicle 300 for the passenger 340 to be picked up.

According to another example, a characteristic of the visual indicator can be an animation. For instance, a predefined animation can be set for the passenger 340. According to an illustration, the predefined animation for the passenger 340 can include marching green ants depicted by the lighting system 332 to be marching around the autonomous vehicle 300 when the autonomous vehicle 300 is stopped to pick up the passenger 340. Moreover, in some examples, common animations can be utilized for passengers (e.g., ants standing still prior to the autonomous vehicle 300 stopping and the ants marching after the autonomous vehicle 300 stops), whereas other characteristics of the visual indicator can be modified based on the identity of the passenger 340 to be picked up (e.g., pink versus yellow ants. Additionally, different colored ants and/or different animation can be used for the passenger 340 if the passenger 340 is approaching an incorrect autonomous vehicle.

According to some examples, an animation emitted by the lighting system 332 controlled by the identification customization system 322 can differ before and after the autonomous vehicle 300 has stopped for passenger pickup. For instance, prior to the control system 326 causing the vehicle propulsion system 306 and/or the braking system 308 to stop the autonomous vehicle 300 for passenger pickup, the animation emitted by the lighting system 302 can indicate to the passenger 340 to be picked up to wait while the autonomous vehicle 300 is still approaching the pickup location. Thereafter, subsequent to the control system 326 causing the mechanical system(s) of the autonomous vehicle 300 to stop the autonomous vehicle 300 for passenger pickup, the animation emitted by the lighting system 302 as controlled by the identification customization system 322 can signify that the timing is appropriate for the passenger 340 to enter into the autonomous vehicle 300.

According to various implementations, the notification system 312 includes the sound system 334. Accordingly, the identification customization system 322 can cause the sound system 334 to emit an audible indicator perceivable external to the autonomous vehicle 300. A characteristic of the audible indicator can be controlled by the identification customization system 322 based on the identity of the passenger 340 to be picked up and whether the autonomous vehicle 300 is stopped for passenger pickup as controlled by the control system 326. According to an example, the characteristic of the audible indicator can be an identity of a song played by the sound system 334. For instance, the song may be streamed from a mobile computing device of the passenger 340 to be picked up (e.g., when the mobile computing device and the autonomous vehicle 300 are within a predetermined distance of each other, via a Wi-Fi network or some other wireless communications technology for pairing the mobile computing device with the sound system 334 of the autonomous vehicle 300). In other examples, substantially any type of audible indicator other than songs can be emitted by the sound system 334 based on the identity of the passenger 340 and the state of the autonomous vehicle 300.

In various examples, when a passenger approaches an incorrect autonomous vehicle, the sound system 334 causes an audible indicator to emit selected sounds to indicate that the autonomous vehicle is not the vehicle hailed by the passenger. In one example, the audible indicator is a message "incorrect vehicle". In other examples, the identification customization system 322 includes passenger selections for incorrect autonomous vehicle audible indicator sounds as well as correct autonomous vehicle audible indicator sounds.

According to various implementations, the notification system 312 includes a motion system 336. Accordingly, the identification customization system 322 can cause the motion system 336 to activate a motion indicator perceivable external to the autonomous vehicle 300. In one example, the autonomous vehicle 312 moves slightly back-and-forth. In another example, the autonomous vehicle rolls slightly forward and/or backward. In another example, one or more articulating exterior components of the autonomous vehicle 300 articulate. In one example, articulating radar components are mounted on the vehicle in the area where left and right rear view mirrors are positioned, and the articulating radar components can rotate around an axis. Thus, in some examples, the notification system 312 can cause the articulating radar components to be articulated as an indicator 314 to the passenger. In some examples, tires on the vehicle can be articulated/turned as an indicator 314.

According to some implementation, in an exemplary operation of the autonomous vehicle 300, the passenger 340 hails an autonomous vehicle using a rideshare application on a mobile device. A central computing system assigns the autonomous vehicle 300 to provide a ride to the passenger 340; thus, the autonomous vehicle 300 is routed to pick up the passenger 340. The autonomous vehicle 300 receives passenger data that specifies an identity of the passenger 340 to be picked up by the autonomous vehicle 300, amongst other information (e.g., a pickup location). The passenger data can further specify a predefined characteristic of an indicator to be utilized by the autonomous vehicle 300 to identify the autonomous vehicle 300 to the passenger 340; however, in other embodiments, the passenger data need not include such data concerning a predefined characteristic. The passenger data can be received responsive to the autonomous vehicle 300 being assigned to pick up the passenger 340.

According to various implementations, the central computing system also receives ride requests from other passengers for pick-up in the same and/or a similar location as the ride request from the passenger 340. In some examples, passenger data for unassigned nearby passengers is also sent to the autonomous vehicle 300, such that if an unassigned nearby passenger approaches the autonomous vehicle 300, a predefined characteristic of an indicator of incorrect vehicle for the approaching passenger can be utilized by the autonomous vehicle 300 to indicate that it is the incorrect autonomous vehicle.

In various implementations, the identification customization system 322 can control the notification system 312 of the autonomous vehicle 300 to output the indicator 314, such that a characteristic of the indicator 314 outputted by the notification system 312 is controlled based on the identity of the passenger 340 to be picked up and whether the autonomous vehicle 300 is stopped for passenger pickup. Similarly, the identification customization system 322 can control the notification system 312 of the autonomous vehicle 300 to output the indicator 314, such that a characteristic of the indicator 314 outputted by the notification system 312 is controlled based on the identity of an unassigned passenger that is approaching the autonomous vehicle 300.

Thus, the identification customization system 322 can control the notification system 312 to output an indicator having a first characteristic for a first passenger and can control the notification system 312 to output an indicator having a second characteristic for a second passenger. For instance, the identification customization system 322 can cause the notification system 312 to play a first song for the passenger 340 (when picking up the passenger 340), whereas the identification customization system 322 can cause the notification system 312 to play a different, second song for a different passenger (when picking up the different passenger). Moreover, the identification customization system 322 can cause the notification system 312 to play a third song for the passenger 340 if the passenger 340 is the incorrect passenger.

According to various implementations, the characteristic of the indicator 314 output by the notification system 312 as controlled by the identification customization system 322 can be predefined by the passenger 340 to be picked up. In particular, the characteristic of the indicator 314 output by the notification system 312 as controlled by the identification customization system 322 can be predefined by the passenger 340 both for the assigned vehicle and for nearby unassigned vehicles. For instance, the predefined characteristic can be specified in the passenger data received by the autonomous vehicle 300. In some examples, the predefined characteristic is set by the passenger 340 when hailing the autonomous vehicle 300, when initializing preferences in an account of the passenger 340, or when modifying the preferences in the account of the passenger 340. According to another example, the characteristic of the indicator 314 outputted by the notification system 312 as controlled by the identification customization system 322 can be selected by the identification customization system 322. Following this example, the identification customization system 322 can cause data specifying the characteristic of the indicator 314 selected for the passenger 340 to be transmitted from the computing system 316. For instance, the data specifying the characteristic of the indicator 314 can be transmitted from the autonomous vehicle 300 to a mobile device of the passenger 340, such that the data can be presented (e.g., displayed or otherwise outputted) to the passenger 340.

Example Autonomous Vehicle Pick-up Environment

Figure 4:
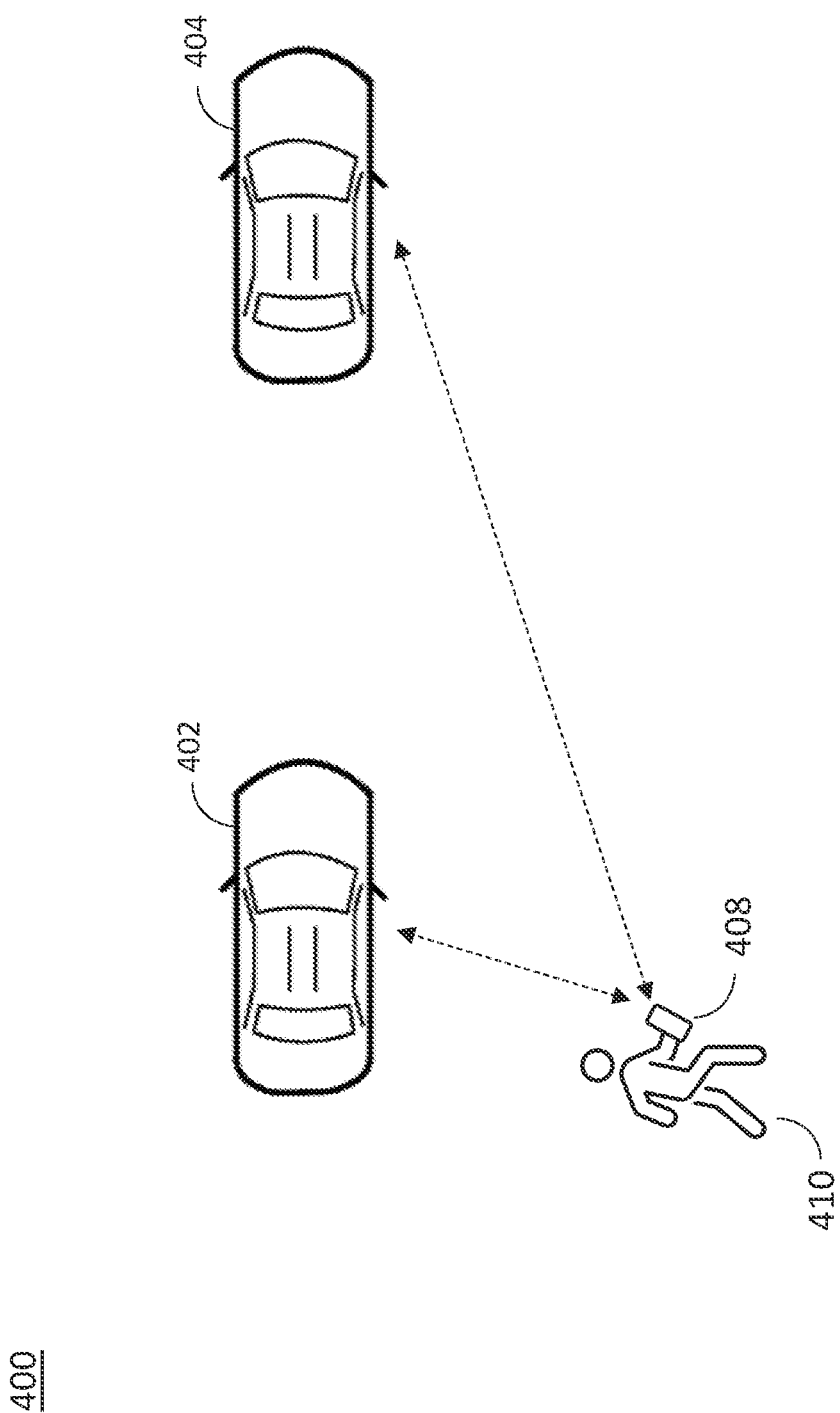
FIG. 4 is a diagram illustrating an exemplary environment that includes first and second autonomous vehicles and a passenger, according to some embodiments of the disclosure.

FIG. 4 illustrates an exemplary environment 400 that includes first 402 and second 404 autonomous vehicles and a passenger 410, according to various embodiments of the invention. According to one example, the first autonomous vehicle 402 is the incorrect vehicle and the second autonomous vehicle 404 is the correct vehicle. In various examples, as the passenger 410 approaches the first autonomous vehicle 402, the first autonomous vehicle 402 indicates to the passenger 410 that it is the incorrect vehicle. In some examples, the first autonomous vehicle 402 directs the passenger 410 to the correct vehicle 404. For instance, the first autonomous vehicle 402 may display an arrow pointing towards the correct autonomous vehicle 404.

The passenger 410 is holding a mobile device 408. In some examples, the passenger 410 activates vehicle identification notifications on the mobile device 408, for example by pushing a button in a rideshare application. In some examples, a rideshare application on the mobile device 408 prompts the user to determine whether the user would like the first 402 and second 404 autonomous vehicles to display identification information. An exemplary mobile device rideshare application interface is described in greater detail with respect to FIGS. 6A-6B.

Additionally, in some examples, the location of the passenger 410 with respect to the first 402 and second 404 autonomous vehicles is determined based on the mobile device 408 location. In one example, GPS data is used to determine the locations of the mobile device 408, the first autonomous vehicle 402, and the second autonomous vehicle 404. In one example, the rideshare application enables transmission of signals between the mobile device 408 and the first 402 and second 404 autonomous vehicles to help determine passenger location with respect to the first 402 and second 404 autonomous vehicles. In some examples, the mobile device 408 location is triangulated based on signals transmitted between the mobile device 408 and the first 402 and second 404 autonomous vehicles. In some examples, signal strength of the mobile device 408 signal at each of the first 402 and second 404 autonomous vehicles is used to determine the mobile device 408 location with respect to each of the first 402 and second 404 autonomous vehicles. Additionally, changes in the mobile device 408 signal with respect to each of the first 402 and second 404 autonomous vehicles can be used to determine direction of passenger 410 movement.

The first 402 and second 404 autonomous vehicles can be substantially similar to the autonomous vehicle 100 or FIG. 1 and/or the autonomous vehicle 300 of FIG. 3.

Figure 5:
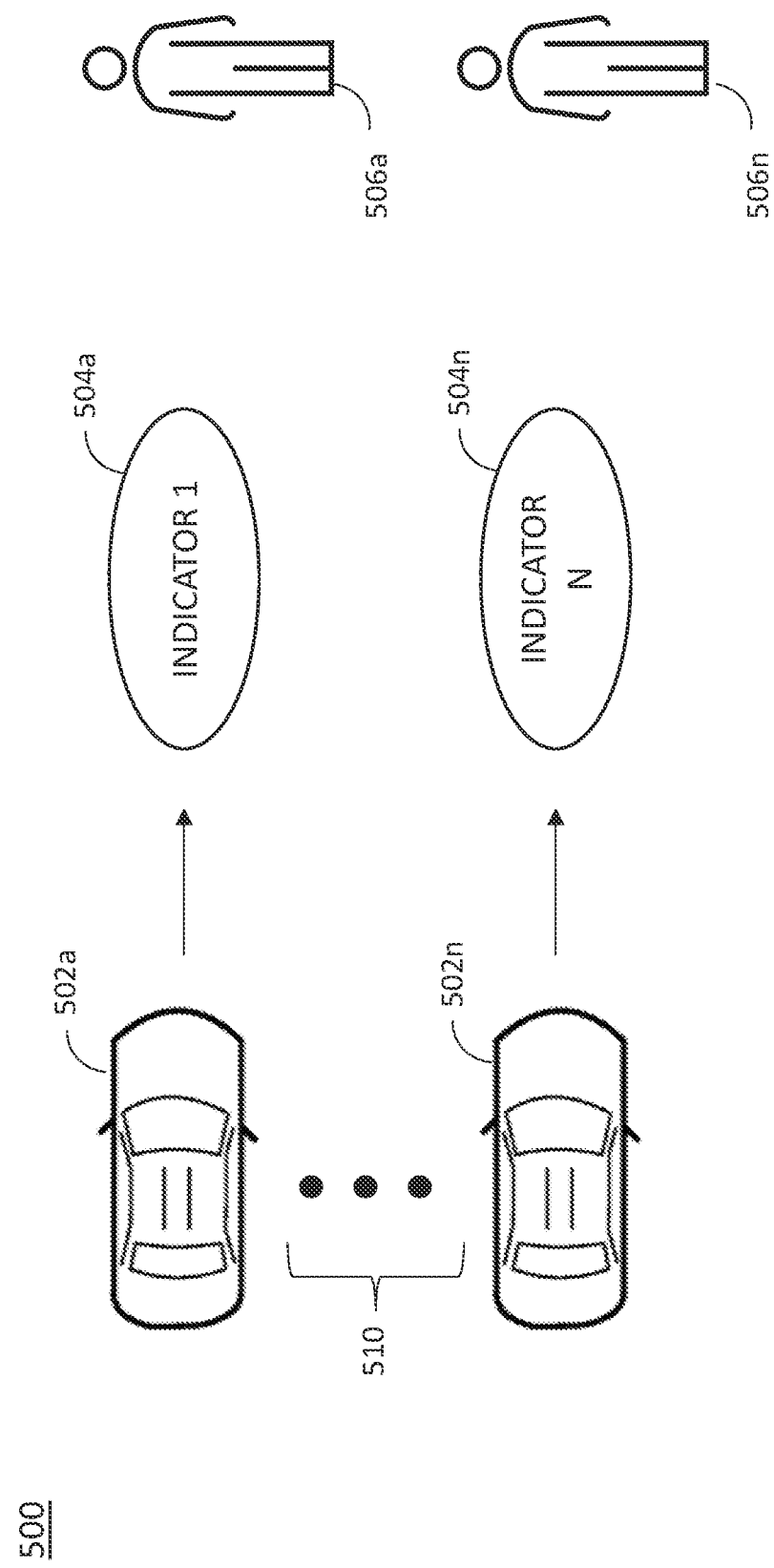
FIG. 5 is a diagram illustrating an exemplary environment that includes a plurality of autonomous vehicles and a plurality of passengers to be picked up within geographic proximity, according to various embodiments of the disclosure.

FIG. 5 illustrates an exemplary environment 500 that includes a plurality of autonomous vehicles and a plurality of passengers to be picked up within geographic proximity, according to various embodiments of the invention. More particularly, the environment 500 includes a first autonomous vehicle 502a and a nth autonomous vehicle 502n, where n can be substantially any integer greater than 1 (collectively referred to herein as autonomous vehicles 502a-502n). As indicated by the dots 510, the environment 500 includes any number of additional autonomous vehicles from 2-(n−1). Additionally, the environment 500 includes a first passenger 506a, and an nth passenger 506n (collectively referred to herein as passengers 506a-506n). In some examples, the environment 500 can include n passengers 506a-506n, more than n passengers 506a-506n, or fewer than n passengers 506a-506n. The autonomous vehicles 502a-502n can be substantially similar to the autonomous vehicle 100 or FIG. 1 and/or the autonomous vehicle 300 of FIG. 3.

Using conventional approaches, it may be difficult for a passenger to discern which autonomous vehicle from a fleet of autonomous vehicles is assigned to the passenger. This is particularly problematic for autonomous vehicles as compared to human driven vehicles since there is no driver to provide feedback to aid in the identification of the autonomous vehicle to the passenger to be picked up by the autonomous vehicle. Furthermore, autonomous vehicles in a fleet tend to have a fairly homogenous appearance. Moreover, with a plurality of autonomous vehicles in geographic proximity, the challenge of identifying the appropriate autonomous vehicle is made more difficult.

However, according to various implementations discussed herein, the autonomous vehicles 502a-502n can each output one or more indicators. In particular, each of the autonomous vehicles 502a-502n can output an indicator notifying a passenger that the respective autonomous vehicle 502a-502n is the correct autonomous vehicle for the respective passenger. Additionally, each of the autonomous vehicles 502a-502n can output an indicator notifying a passenger that the respective autonomous vehicle 502a-502n is the incorrect autonomous vehicle for the respective passenger. For instance, the first autonomous vehicle 502a can output a first indicator 504a to the first passenger 506a indicating that the first autonomous vehicle 502a is the correct autonomous vehicle for the first passenger 506a. Additionally, the nth autonomous vehicle 502n can output a nth indicator 504n to the first passenger 506a indicating that the nth autonomous vehicle 502n is the incorrect autonomous vehicle for the first passenger 506a. Similarly, the nth autonomous vehicle 502n can output a nth indicator 504n to the nth passenger 506n indicating that the nth autonomous vehicle 502n is the correct autonomous vehicle for the nth passenger 506a, and the first autonomous vehicle 502a can output a first indicator 504a to the nth passenger 506a indicating that the first autonomous vehicle 502a is the incorrect autonomous vehicle for the first passenger 506a. In various examples, the first indicator 504a is different for the first passenger 506a than for the nth passenger 506n.

As described herein, the first autonomous vehicle 502a controls a characteristic of the first indicator 504a (e.g., based on the identity of the first passenger 506a to be picked up by the first autonomous vehicle 502a, whether the first autonomous vehicle 502a is stopped for passenger pickup, and/or based on an approaching passenger who is not the first passenger 506a). The remaining autonomous vehicles 502a-502n can similarly control characteristics of the indicators 504a-504n respectively outputted thereby. Accordingly, when in the environment 500 with a plurality of autonomous vehicles 502a-502n, the first autonomous vehicle 502a can control the characteristic of the first indicator 504a such that the first passenger 506a to be picked up can distinguish that the first autonomous vehicle 502a is to provide the ride to the first passenger 506a and that the timing is appropriate (or not appropriate) for the first passenger 506a to attempt to enter into the first autonomous vehicle 502a. Furthermore, the nth autonomous vehicle 502n can control the characteristic of the nth indicator 504n such that the first passenger 506a to be picked up can distinguish that the nth autonomous vehicle 502n is the incorrect vehicle, and thus the first passenger 506a will not attempt to enter into the nth autonomous vehicle 502n.

Similarly, when in the environment 500 with a plurality of autonomous vehicles 502a-502n, the nth autonomous vehicle 502n can control the characteristic of the nth indicator 504n such that the nth passenger 506n to be picked up can distinguish that the nth autonomous vehicle 502n is to provide the ride to the nth passenger 506n and that the timing is appropriate (or not appropriate) for the nth passenger 506n to attempt to enter into the nth autonomous vehicle 502n. Furthermore, the first autonomous vehicle 502a can control the characteristic of the first indicator 504a such that the nth passenger 506n to be picked up can distinguish that the first autonomous vehicle 502a is the incorrect vehicle, and thus the nth passenger 506n will not attempt to enter into the first autonomous vehicle 502a.

Example Device for Vehicle Identification

Figure 6B:
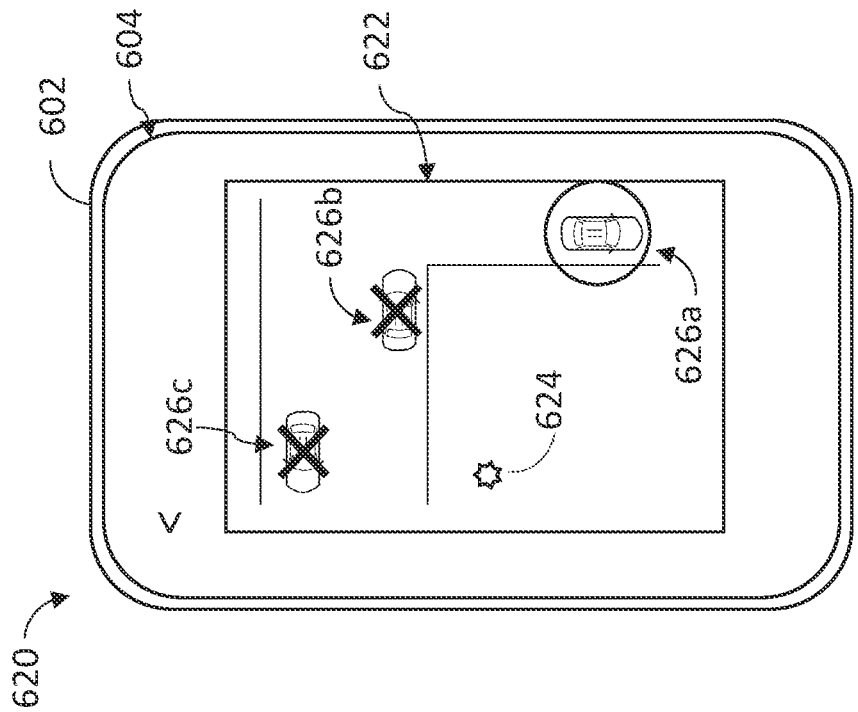
FIGS. 6A and 6B show examples of a device interface for vehicle identification, according to some embodiments of the disclosure.
Figure 6A:
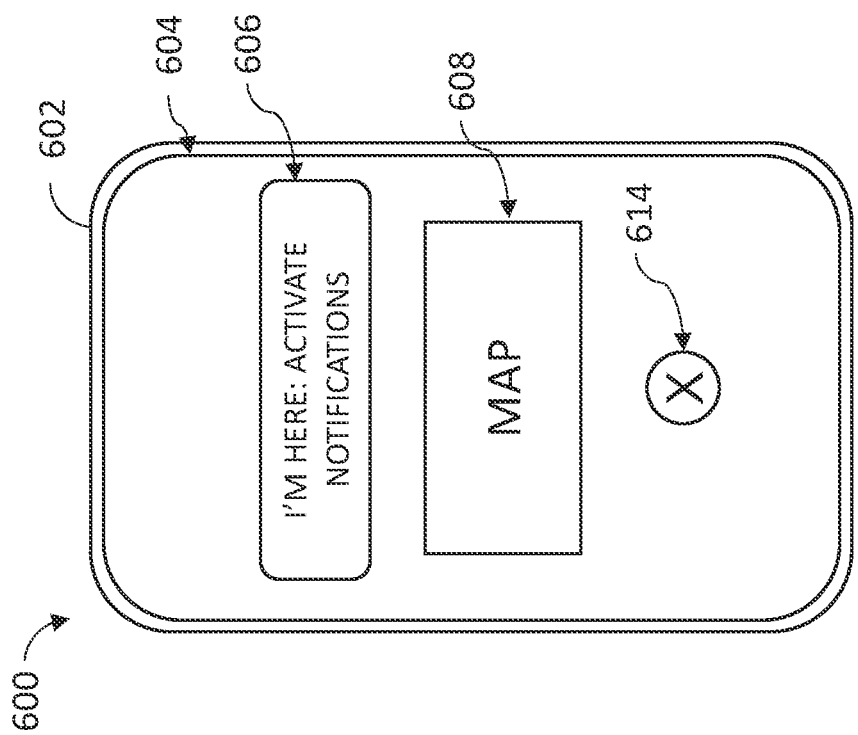

FIGS. 6A and 6B show examples 600, 620 of a device interface for vehicle identification, according to some embodiments of the disclosure. In particular, FIG. 6A shows an example 600 of a device 602 showing a rideshare application interface 604 providing the user the option to activate autonomous vehicle external notifications via the button 606. According to the example shown in FIG. 6A, the rideshare application interface 604 also displays a map 608 and a close button 614. Selection of the close button 614 closes out of the interface 604, returning to a main (or previous) rideshare application interface.

According to various implementations, the rideshare application interface 604 displays on a user's mobile device 602 when a user's autonomous vehicle nears (and/or arrives at) the user's pick-up location. The button 606 allows the user to activate autonomous vehicle external notifications, including notifications by the correct autonomous vehicle and notification by incorrect autonomous vehicles as discussed above. In some examples, the rideshare application interface 604 is displayed to the user (and the user may elect to push the button 606) when the user is looking for the user's autonomous vehicle and/or when the user is having difficulty identifying the correct autonomous vehicle. In some examples, the rideshare application interface 604 is displayed through the rideshare application on the mobile device 602 when a user approaches an incorrect vehicle. In some implementations, a user has turned on rideshare application settings to automatically activate autonomous vehicle identification notifications, while in some implementations, a user is given an option to turn on autonomous vehicle external notifications each time the user orders an autonomous vehicle ride. In some examples, a user can turn off the autonomous vehicle external notifications option.

In some examples, the map 608 in FIG. 6A is simply a button that a user selects to take them to a map view. In other examples, the map 608 displays a small map showing the user's location and the user's autonomous vehicle's location. In either case, when a user touches and/or selects the map 608, the mobile device 602 displays a map. FIG. 6B shows an example 620 of the device 602 with the rideshare application interface 604 showing a map 622. The map 622 shows the user's location 624 with respect to nearby streets. Additionally, the map 622 shows nearby autonomous vehicles. In the example shown in FIG. 6B, there are three nearby autonomous vehicles 626a, 626b, 626c. Furthermore, for each of the nearby autonomous vehicles 626a, 626b, 626c, the map 622 includes an indication of whether the respective autonomous vehicle 626a, 626b, 626c is the correct or incorrect autonomous vehicle for the user. As shown in the example of FIG. 6B, the correct autonomous vehicle 626a is circled, while the incorrect autonomous vehicles 626b, 626c have an "X" overlaid on top of them. In other examples, the correct autonomous vehicle 626a is highlighted with a specific color (e.g., green), while the incorrect autonomous vehicles 626b, 626c are highlighted with a different color (e.g., red). In another example, the correct autonomous vehicle 626a flashes while the incorrect autonomous vehicles 626b, 626c are greyed out. In some examples, the indication on the map 622 of which autonomous vehicle 626a, 626b, 626c is the correct vs incorrect autonomous vehicle matches external notification indicators on each of the autonomous vehicles 626a, 626b, 626c. The map 622 is configured to frequently update to show the user's location with respect to nearby autonomous vehicles.

Example of Autonomous Vehicle Fleet

Figure 7:
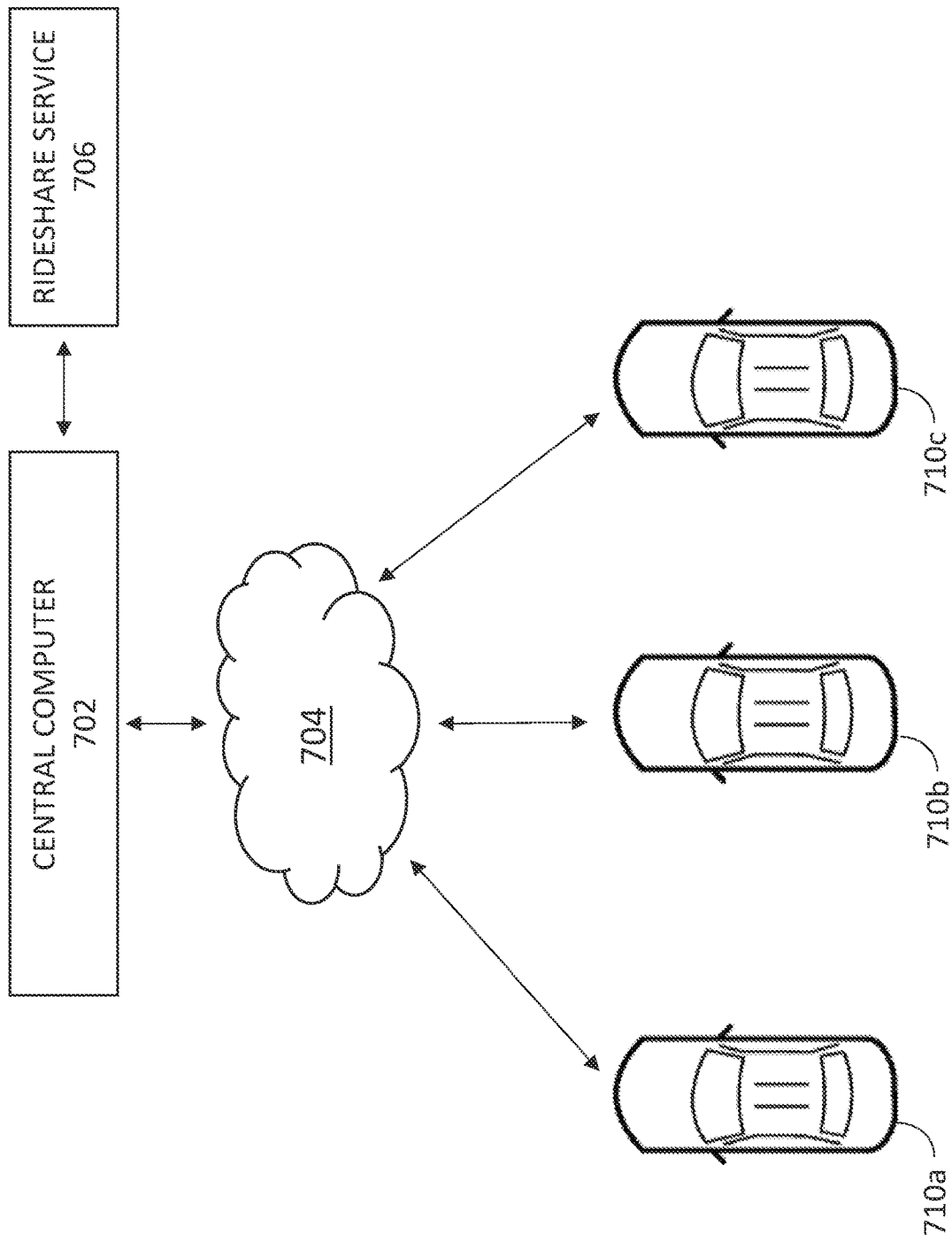
FIG. 7 is a diagram illustrating a fleet of autonomous vehicles in communication with a central computer, according to some embodiments of the disclosure.

FIG. 7 is a diagram 700 illustrating a fleet of autonomous vehicles 710a, 710b, 710c in communication with a central computer 702, according to some embodiments of the disclosure. As shown in FIG. 7, the vehicles 710a-710c communicate wirelessly with a cloud 704 and a central computer 702. The central computer 702 includes a routing coordinator and a database of information from the vehicles 710a-710c in the fleet. Autonomous vehicle fleet routing refers to the routing of multiple vehicles in a fleet. The central computer also acts as a centralized ride management system and communicates with rideshare users via a rideshare service 706. The vehicles 710a-710c can each be used to implement the image autonomous vehicle identification systems and methods of FIGS. 2 and 3. In some implementations, the autonomous vehicles 710a-710c communicate directly with each other.

When a passenger requests a ride through a rideshare service 706, the rideshare service 706 sends the request to central computer 702. The central computer 702 selects a vehicle 710a-710c based on the request. When the vehicle 710a-710c nears (or arrives at) the pick-up location, the central computer 702 may instruct the vehicle 710a-710c to perform various autonomous vehicle identification indicators. In particular, when several vehicles 710a-710c are present in the same general pick-up area, each vehicle 710a-710c can perform various autonomous vehicle identification indicators indicating that each respective vehicle is the correct or incorrect vehicle for various respective nearby passengers. The vehicles 710a, 710b, 710c communicate with a central computer 702 via a cloud 704.

Once a destination is selected and the user has ordered a vehicle, the routing coordinator can optimize the routes to avoid traffic as well as to optimize vehicle occupancy. In some examples, an additional passenger can be picked up en route to the destination, and the additional passenger can have a different destination. In various implementations, since the routing coordinator has information on the routes for all the vehicles in the fleet, the routing coordinator can adjust vehicle routes to reduce congestion and increase vehicle occupancy. Note that in order for the routing coordinator to optimize routes and increase vehicle occupancy, it is important that passengers ride in the assigned vehicle and not a different vehicle in the fleet that is also present for a passenger pick-up at the same location.

As described above, each vehicle 710a-710c in the fleet of vehicles communicates with a routing coordinator. Thus, information gathered by various autonomous vehicles 710a-710c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals, such as passing a photogenic location. In some examples, the routing coordinator uses collected position data corresponding to emergency events to generate a best route for an autonomous vehicle to avoid a potential emergency situation.

According to various implementations, a set of parameters can be established that determine which metrics are considered (and to what extent) in determining routes or route modifications. For example, expected congestion or traffic based on a known event can be considered. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, view from the vehicle of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination. In some implementations, the routing coordinator in the central computing system 702 generates a route for each selected autonomous vehicle 710a-710c, and the routing coordinator determines a route for the autonomous vehicle 710a-710c to travel from the autonomous vehicle's current location to a destination.

Example of a Computing System for Ride Requests

Figure 8:
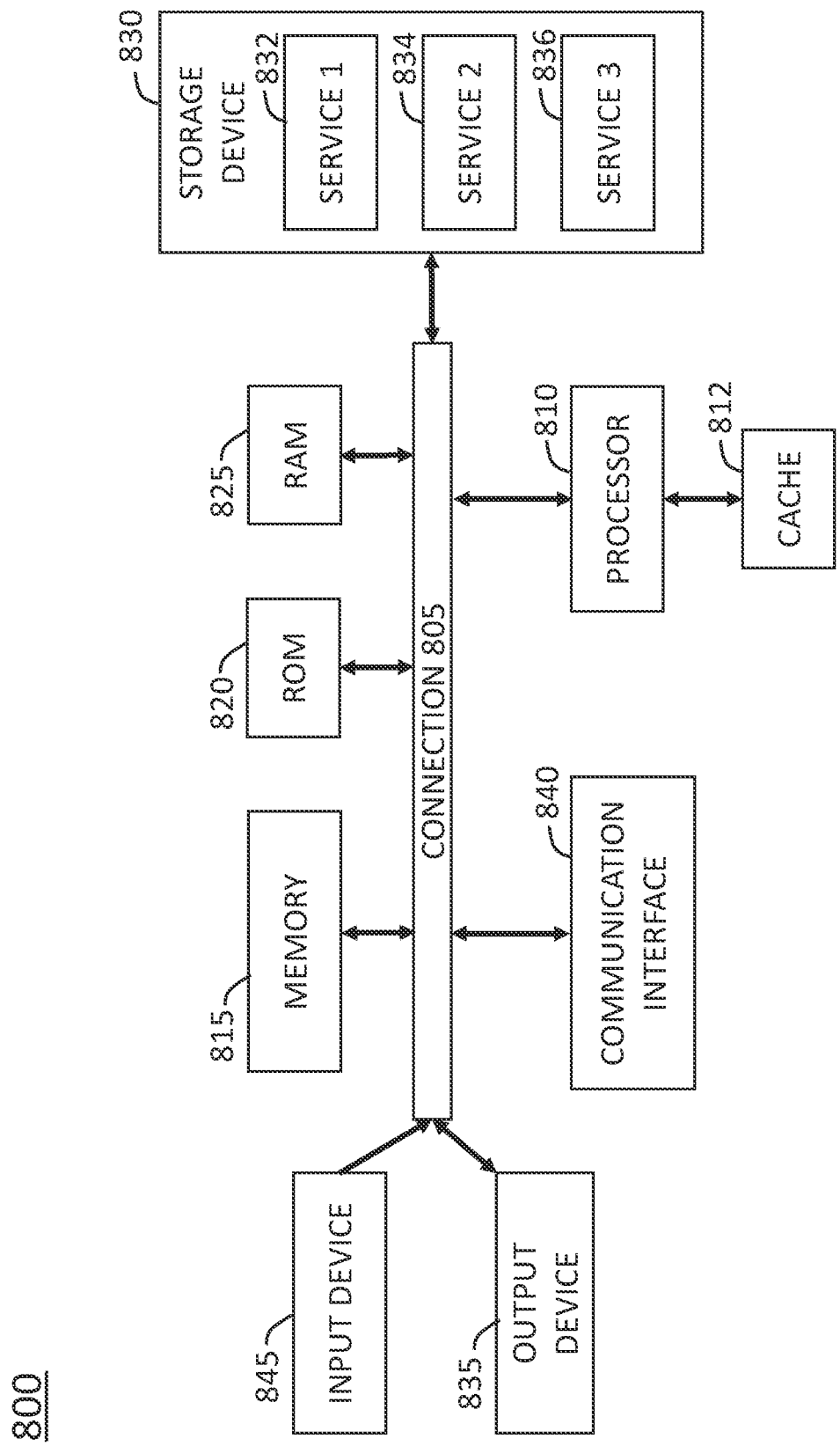
FIG. 8 shows an example embodiment of a system for implementing certain aspects of the present technology.

FIG. 8 shows an example embodiment of a computing system 800 for implementing certain aspects of the present technology. In various examples, the computing system 800 can be any computing device making up the onboard computer 104, the central computing system 702, or any other computing system described herein. The computing system 800 can include any component of a computing system described herein which the components of the system are in communication with each other using connection 805. The connection 805 can be a physical connection via a bus, or a direct connection into processor 810, such as in a chipset architecture. The connection 805 can also be a virtual connection, networked connection, or logical connection.

In some implementations, the computing system 800 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 800 includes at least one processing unit (CPU or processor) 810 and a connection 805 that couples various system components including system memory 815, such as read-only memory (ROM) 820 and random access memory (RAM) 825 to processor 810. The computing system 800 can include a cache of high-speed memory 812 connected directly with, in close proximity to, or integrated as part of the processor 810.

The processor 810 can include any general-purpose processor and a hardware service or software service, such as services 832, 834, and 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction, the computing system 800 includes an input device 845, which can represent any number of input mechanisms, such as a microphone for speech, a touch-sensitive screen for gesture or graphical input, keyboard, mouse, motion input, speech, etc. The computing system 800 can also include an output device 835, which can be one or more of a number of output mechanisms known to those of skill in the art. In some instances, multimodal systems can enable a user to provide multiple types of input/output to communicate with the computing system 800. The computing system 800 can include a communications interface 840, which can generally govern and manage the user input and system output. There is no restriction on operating on any particular hardware arrangement, and therefore the basic features here may easily be substituted for improved hardware or firmware arrangements as they are developed.

A storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as a processor 810, a connection 805, an output device 835, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a method for autonomous vehicle identification, comprising: assigning a first autonomous vehicle to a user; determining a pick-up location; detecting a decrease in a first distance between the user and a second autonomous vehicle at the pick-up location; and performing, by the second autonomous vehicle, a notification operation, wherein the notification operation is configured to indicate that the second autonomous vehicle is not assigned to the user.

Example 2 provides a method according to one or more of the preceding and/or following examples, wherein detecting the decrease in the first distance includes: receiving, at the second autonomous vehicle, a signal from a mobile device of the user, and determining, based on the received signal, a second distance between the mobile device and the second autonomous vehicle.

Example 3 provides a method according to one or more of the preceding and/or following examples, wherein detecting the decrease in the first distance includes detecting an increase in a strength of the received signal.

Example 4 provides a method according to one or more of the preceding and/or following examples, wherein detecting the decrease in the first distance includes identifying the user via facial recognition.

Example 5 provides a method according to one or more of the preceding and/or following examples, further comprising determining a change in a second distance between the user and the first autonomous vehicle.

Example 6 provides a method according to one or more of the preceding and/or following examples, further comprising determining the user is approaching the second autonomous vehicle.

Example 7 provides a method according to one or more of the preceding and/or following examples, wherein performing the notification operation includes activating at least one of a visual notification, an audible notification, and a motion notification on the second autonomous vehicle.

Example 8 provides a method according to one or more of the preceding and/or following examples, wherein performing the notification operation includes activating a notification indicator perceivable from a position external to the second autonomous vehicle.

Example 9 provides a system for autonomous vehicle identification in an autonomous vehicle fleet, comprising: a first autonomous vehicle; a central computing system configured to assign the first autonomous vehicle to a user for a user ride including a pick-up location; and a second autonomous vehicle including: a sensor system configured to detect the user at the pick-up location, and further configured to detect a decrease in a first distance between the user and the second autonomous vehicle; and a notification system configured to perform a notification operation to indicate that the second autonomous vehicle is not assigned to the user.

Example 10 provides a system according to one or more of the preceding and/or following examples, wherein the notification system includes at least one of a sound system, a lighting system, and a motion system.

Example 11 provides a system according to one or more of the preceding and/or following examples, wherein the notification system includes a notification indicator perceivable from a position external to the second autonomous vehicle.

Example 12 provides a system according to one or more of the preceding and/or following examples, wherein the notification indicator directs the user to the first autonomous vehicle.

Example 13 provides a system according to one or more of the preceding and/or following examples, wherein the central computing system is configured to communicate with a user device via a rideshare application, and wherein the rideshare application includes an option for activating the notification system.

Example 14 provides a system according to one or more of the preceding and/or following examples, wherein the first autonomous vehicle includes a first notification system configured to perform a first notification operation to indicate that the first autonomous vehicle is assigned to the user.

Example 15 provides a system according to one or more of the preceding and/or following examples, wherein the first autonomous vehicle includes a sensor system configured to detect the user at the pick-up location, and further configured to determine a second distance between the user and the first autonomous vehicle.

Example 16 provides a system according to one or more of the preceding and/or following examples, wherein the sensor system is configured to receive a signal from a mobile device of the user and wherein the sensor system is further configured to determine the first distance based on the signal.

Example 17 provides an autonomous vehicle having an autonomous vehicle identification system, comprising: a computing system configured to receive a first identity of an assigned passenger and a second identity of an unassigned passenger; a sensor system configured to detect the assigned passenger and the unassigned passenger at a pick-up location, and further configured to detect a decrease in a distance between the unassigned passenger and the autonomous vehicle; and a notification system configured to perform a notification operation to indicate that the autonomous vehicle is not assigned to the unassigned passenger.

Example 18 provides an autonomous vehicle according to one or more of the preceding and/or following examples, wherein the notification system includes at least one of a sound system, a lighting system, and a motion system.

Example 19 provides an autonomous vehicle according to one or more of the preceding and/or following examples, wherein the notification system includes a notification indicator perceivable from a position external to the autonomous vehicle.

Example 20 provides an autonomous vehicle according to one or more of the preceding and/or following examples, wherein the notification indicator directs the unassigned passenger towards a second autonomous vehicle, wherein the second autonomous vehicle is assigned to the unassigned passenger.

Example 21 provides an autonomous vehicle having an autonomous vehicle identification system, comprising: a computing system configured to receive an identity of an assigned passenger; a sensor system configured to detect the assigned passenger at a pick-up location; and a notification system configured to perform a notification operation including a motion indicator to indicate that the autonomous vehicle is assigned to the passenger.

Example 22 provides an autonomous vehicle according to one or more of the preceding and/or following examples, wherein the motion indicator is configured to wiggle the autonomous back and forth.

Example 23 provides an autonomous vehicle according to one or more of the preceding and/or following examples, wherein the motion indicator is configured to articulate an external component of the autonomous vehicle around an axis.

Example 24 provides an autonomous vehicle according to one or more of the preceding and/or following examples, wherein the external component is a radar component.

Example 25 provides an autonomous vehicle according to one or more of the preceding and/or following examples, wherein the external component is autonomous vehicle side view mirrors.

Example 26 provides an autonomous vehicle according to one or more of the preceding and/or following examples, wherein the external component is positioned near a typical side view mirror location.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for autonomous vehicle identification, comprising:
    assigning a first autonomous vehicle to a first user;
    assigning a second autonomous vehicle to a second user;
    determining a pick-up location for the first user and the first autonomous vehicle;
    detecting a decrease in a first distance between the first user and the second autonomous vehicle at the pick-up location, wherein detecting the decrease in the first distance includes receiving a first user mobile device signal at the second autonomous vehicle and detecting an increase in a strength of the first user mobile device signal;
    identifying an increase in a second distance between the first user and the first autonomous vehicle at the pick-up location;
    determining that the first user is approaching the second autonomous vehicle based on detecting the decrease in the first distance;
    determining that the first user is moving away from the first autonomous vehicle based on detecting the increase in the second distance;
    detecting a decrease in a third distance between the second user and the second autonomous vehicle;
    performing, by the second autonomous vehicle, a first notification operation, including activating a first notification indicator perceivable from a position external to the second autonomous vehicle, wherein the first notification operation is configured to indicate that the second autonomous vehicle is not assigned to the first user; and
    performing, by the second autonomous vehicle, a second notification operation, wherein the second notification operation is configured to indicate that the second autonomous vehicle is assigned to the second user;
    wherein the first notification operation is performed on a first side of the second autonomous vehicle based on the first user being proximate the first side of the second autonomous vehicle and the second notification operation is performed on a second side of the second autonomous vehicle based on the second user being proximate the second side of the second autonomous vehicle,
    wherein the first notification operation is different from the second notification operation, including the indication provided by the first notification operation being different from the indication provided by the second notification operation, and
    wherein the first notification operation and the second notification operation are performed concurrently.

2. The method of claim 1, wherein detecting the decrease in the first distance includes identifying the user via facial recognition.

3. The method of claim 1, wherein performing the notification operation includes activating at least one of a visual notification, an audible notification, and a motion notification on the second autonomous vehicle.

4. A system for autonomous vehicle identification in an autonomous vehicle fleet, comprising:
    a first autonomous vehicle;
    a central computing system configured to assign the first autonomous vehicle to a first user for a first user ride including a pick-up location, and assign a second autonomous vehicle to a second user; and
    the second autonomous vehicle including:
        a sensor system configured to:
            detect the first user at the pick-up location, and
            receive a first user mobile device signal;
        an onboard computer configured to:
            determine a first distance between the first user and the second autonomous vehicle,
            detect an increase in a strength of the first user mobile device signal,
            detect a decrease in the first distance based on the increase in the strength of the first user mobile device signal,
            determine that the first user is approaching the second autonomous vehicle, and
            detect a decrease in a second distance between the second user and the second autonomous vehicle; and
        a notification system configured to perform a first notification operation on a first side of the second autonomous vehicle based on the first user being proximate the first side of the second autonomous vehicle to indicate that the second autonomous vehicle is not assigned to the first user, wherein the first notification operation is a notification indicator perceivable from a position external to the second autonomous vehicle, and perform a second notification operation on a second side of the second autonomous vehicle based on the second user being proximate the second side of the second autonomous vehicle, wherein the second notification operation is configured to indicate that the second autonomous vehicle is assigned to the second user,
        wherein the first notification operation is different from the second notification operation, including the indication provided by the first notification operation being different from the indication provided by the second notification operation.

5. The system of claim 4, wherein the notification system includes at least one of a sound system, a lighting system, and a motion system.

6. The system of claim 4, wherein the notification indicator directs the first user to the first autonomous vehicle.

7. The system of claim 4, wherein the central computing system is configured to communicate with a user device via a rideshare application, and wherein the rideshare application includes an option for activating the notification system.

8. The system of claim 4, wherein the first autonomous vehicle includes:
   a first onboard computer configured to:
      determine a third distance between the first user and the first autonomous vehicle,
      detect a decrease in a strength of the first user mobile device signal, and
      detect an increase in the third distance based on the decrease in the strength of the first user mobile device signal, and
      determine that the first user is moving away from the first autonomous vehicle; and
   a first notification system configured to perform a first third notification operation to indicate that the first autonomous vehicle is assigned to the user.

9. The sensor system of claim 8, wherein the first autonomous vehicle includes a sensor system configured to detect the first user at the pick-up location, and further configured to detect the first user mobile device signal.

10. An autonomous vehicle having an autonomous vehicle identification system, comprising:
   a computing system configured to receive a first identity of an assigned passenger and a second identity of an unassigned passenger;
   a sensor system configured to:
      detect the assigned passenger and the unassigned passenger at a pick-up location, and
      receive a first mobile device signal of the unassigned passenger and a second mobile device signal of the assigned passenger;
   an onboard computer configured to:
      determine a first distance between the unassigned passenger and the autonomous vehicle,
      detect an increase in a strength of the first mobile device signal,
      detect a decrease in the first distance based on the increase in the strength of the first mobile device signal, and
      determine that the unassigned passenger is approaching the second autonomous vehicle; and
   a notification system configured to:
      perform a first notification operation on a first side of the autonomous vehicle based on the unassigned passenger being proximate the first side of the second autonomous vehicle to indicate that the autonomous vehicle is not assigned to the unassigned passenger, wherein the first notification operation is a first notification indicator perceivable from a position external to the second autonomous vehicle, and
      perform a second notification operation on a second side of the autonomous vehicle based on the assigned passenger being proximate the second side of the second autonomous vehicle, wherein the second notification operation is configured to indicate that the autonomous vehicle is assigned to the assigned user,
      wherein the first notification operation is different from the second notification operation, including the indication provided by the first notification operation being different from the indication provided by the second notification operation.

11. The autonomous vehicle of claim 10, wherein the notification system includes at least one of a sound system, a lighting system, and a motion system.

12. The autonomous vehicle of claim 10, wherein the notification indicator directs the unassigned passenger towards a second autonomous vehicle, wherein the second autonomous vehicle is assigned to the unassigned passenger.

13. The method of claim 1, wherein the notification indicator is a first notification indicator and the position is a first position of the first user, wherein the first notification indicator is perceivable from the first position, and wherein performing the second notification operation includes activating a second notification indicator perceivable from a second position of the second user external to the second autonomous vehicle.

14. The method of claim 1 wherein the notification indicator is a first notification indicator and wherein performing the second notification operation includes activating a second notification indicator, and wherein performing the first notification operation includes
   consulting receiving a first indicator customization selection from a first user account for the first user, and
      wherein performing the second notification operation includes consulting receiving a second indicator customization selection from a second user account for the second user.

15. The autonomous vehicle of claim 10, wherein the notification indicator is a first notification indicator and the position is a first position of the unassigned passenger, wherein the first notification indicator is perceivable from the first position, and wherein the notification system is further configured to perform a second notification operation including activating a second notification indicator perceivable from a second position of the assigned passenger external to the second autonomous vehicle.

16. The method of claim 1, wherein performing the first notification operation includes displaying first lights having a first color on the first side of the second autonomous vehicle, and wherein performing the second notification operation includes displaying second lights having a second color on the second side of the second autonomous vehicle.

17. The method of claim 1, wherein performing the first notification operation includes displaying an x mark on the first side of the second autonomous vehicle, and wherein performing the second notification operation includes displaying a check mark on the second side of the second autonomous vehicle.

18. The method of claim 1, wherein performing the first notification operation includes displaying blinking lights on the first side of the second autonomous vehicle, and wherein performing the second notification operation includes displaying constant solid lights on the second side of the second autonomous vehicle.

19. The autonomous vehicle of claim 10, the notification indicator is a first notification indicator, wherein the second notification operation is a second notification indicator, and wherein the first notification indicator is a first directional identification notification directed toward the first side of the autonomous vehicle, and wherein the second notification indicator is a second directional identification notification directed toward the second side of the autonomous vehicle.

20. The autonomous vehicle of claim 10, wherein the notification indicator is a first notification indicator, wherein the second notification operation is a second notification indicator, and wherein the second notification indicator has a first characteristic while the second autonomous vehicle is driving and wherein the second notification indicator has a second characteristic when the second autonomous vehicle is stopped for passenger pickup.

\* \* \* \* \*